US006279151B1

(12) United States Patent
Breslau et al.

(10) Patent No.: US 6,279,151 B1
(45) Date of Patent: *Aug. 21, 2001

(54) METHOD AND APPARATUS FOR REMOTE SOURCE CODE INCLUSION

(75) Inventors: Franklin C. Breslau, Teaneck, NJ (US); Paul G. Greenstein, Croton-on-Hudson; John T. Rodell, Poughkeepsie, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/009,293

(22) Filed: Jan. 20, 1998

(51) Int. Cl.[7] .................................................. G06F 9/445
(52) U.S. Cl. ....................... 717/6; 717/5; 717/7; 717/10; 717/11
(58) Field of Search .................................... 395/705, 706, 395/707; 717/6, 5, 7, 10, 11

(56) References Cited

U.S. PATENT DOCUMENTS

| | | | |
|---|---|---|---|
| 5,023,907 | 6/1991 | Johnson et al. | 380/4 |
| 5,185,860 | 2/1993 | Wu | 395/200 |
| 5,204,897 | 4/1993 | Wyman | 380/4 |
| 5,339,435 | 8/1994 | Lubkin et al. | 395/700 |
| 5,371,852 | 12/1994 | Attanasio et al. | 395/200 |
| 5,386,369 | 1/1995 | Christiano | 364/464 |
| 5,418,957 | 5/1995 | Narayan | 395/700 |
| 5,437,029 | 7/1995 | Sinha | 395/600 |
| 5,499,340 | 3/1996 | Barritz | 395/184 |
| 5,517,635 | 5/1996 | Cross et al. | 395/500 |
| 5,692,196 | * 11/1997 | Unni et al. | 395/705 |
| 5,706,502 | 1/1998 | Foley et al. | . |
| 5,732,219 | * 3/1998 | Blumer et al. | 395/200.57 |
| 5,761,499 | 6/1998 | Sonderegger | . |
| 5,778,231 | * 7/1998 | Van Hoff et al. | 717/5 |
| 6,185,733 | * 2/2001 | Breslau et al. | 717/5 |

OTHER PUBLICATIONS

Eck et al., "A New Compression Scheme for Syntactically Structured Messages (Programs) and its Application to Java and the Internet", IEEE, pp. 542, 1998.*

(List continued on next page.)

Primary Examiner—Mark Powell
Assistant Examiner—Ted T. Vo
(74) Attorney, Agent, or Firm—William A. Kinnaman, Jr.

(57) ABSTRACT

A method and apparatus for operating a compiler to process include statements contained in a source program that specify include files resident at non-connected network locations. The compiler also receives as input include options specifying include file libraries. The compiler initially examines each include option to determine whether it specifies an include file library resident at a non-connected network location. If it does, the compiler establishes a connection with the network location and obtains a list of the contents of the include file library via the connection. The compiler then examines each include statement to determine whether it specifies an include file resident at a non-connected network location. If it does, the compiler establishes a connection with the network location and obtains the include file via the connection. The retrieved include file is then used for compiling the source code to create the object program.

22 Claims, 9 Drawing Sheets

OTHER PUBLICATIONS

IBM C Set ++ for AIX Reference Summary—Version 3 Release 1 SX09–1300–01—Second Edition (Aug. 1995).

IBM VSE/Enterprise Systems Architecture—VSE/Central Functions Linkage Editor Diagnosis Reference, Version 6 Release 1—First Edition (Apr. 1995) LY33–9169–00.

IBM/VSE Enterprise Systems Architecture—System Control Statements–Version 2, Release 1—First Edition (Apr. 1995)—SC33–6613–00.

IBM TDB—vol. 29, No. 8, 1/87—"Execution–Time Loading . . . Stubs" M.R. Beghtel et al—p. 3521.

IBM TDB—vol. 33, No. 6B, 11/90—Tracing The Exported Entry Points In An OS/2 Dynamic Link Library—R.C. Weeks—pp. 140–141.

IBM TDB—vol. 33, No. 7, 12/90—Tracing the Undocumented Exported Entry Points In An OS/2 . . . Library—R.C. Weeks—pp. 273–274.

IBM TDB—vol. 34, No. 1, 6/91—Alternate Image DLL Specification And Display In Office Vision/2—Bell et al—pp. 1–2.

IBM TDB—vol. 34, No. 4B, 9/91—Loading DLLs by ID Rather than By Name—Cox et al—p. 19.

IBM TDB—vol. 34, No. 6, 11/91—Dynamic Link Library Mechanism In DOS Environment—Johnson et al—pp. 209–210.

IBM TDB—vol. 35, No. 2, 7/92—Using a Universal QIC–122 CODEC For Dynamic Linking of Ojbect Code—Medan—pp. 54–55.

IBM TDB—vol. 35, No. 7, 12/92—Method and Mechanism For Dynamic Loader—Chan et al—pp. 8–13.

IBM TDB—vol. 36, No. 6A, 6/93—Transparent Dynamic Link Library Interface—Lennon et al—p. 195.

IBM TDB—vol. 36, No. 10, 10/93 –Transparently Separating Functions from a . . . Library—Corn et al—pp. 475–476.

IBM TDB—vol. 37, No. 2B, 2/94—Dynamic Link Library for Recognizing Multiplexed Keystrokes—Marik et al—pp. 483–484.

IBM TDB—vol. 37, No. 3, 3/94—Execution Trace Analysis of OS/2 2 .DLLs Using an Intercept Layer—Christensen et al—pp. 373–375.

IBM TDB—vol. 37, No. 4B –4/94—Dynamic Link Library Merge Utility Dobbelstein et al—pp. 129–134.

IBM TDB—vol. 37, No. 6B—6/94—Support for Dynamic Config of Link Support . . . UNIX—Baker, pp. 31–32.

IBM TDB—vol. 37, No. 12—12/94—Inter–Program Binding—Hicks et al—pp. 415–420.

IBM TDB—vol. 39, No. 1—1/96—Dynamic Interception Of Imported Procedure Calls—Blaschke—pp. 197–201.

IBM TDB—vol. 39, No. 4—4/96—Efficient Method for Implementing Pre–Compiled Headers for C and C ++—Brolley et al—pp. 165–170.

Phelps et al., "Towards Active, Extensible, Networked Documents: Multivalent Architecture and Applications", DL '96, ACM, 1996, pp. 100–108.

\* cited by examiner

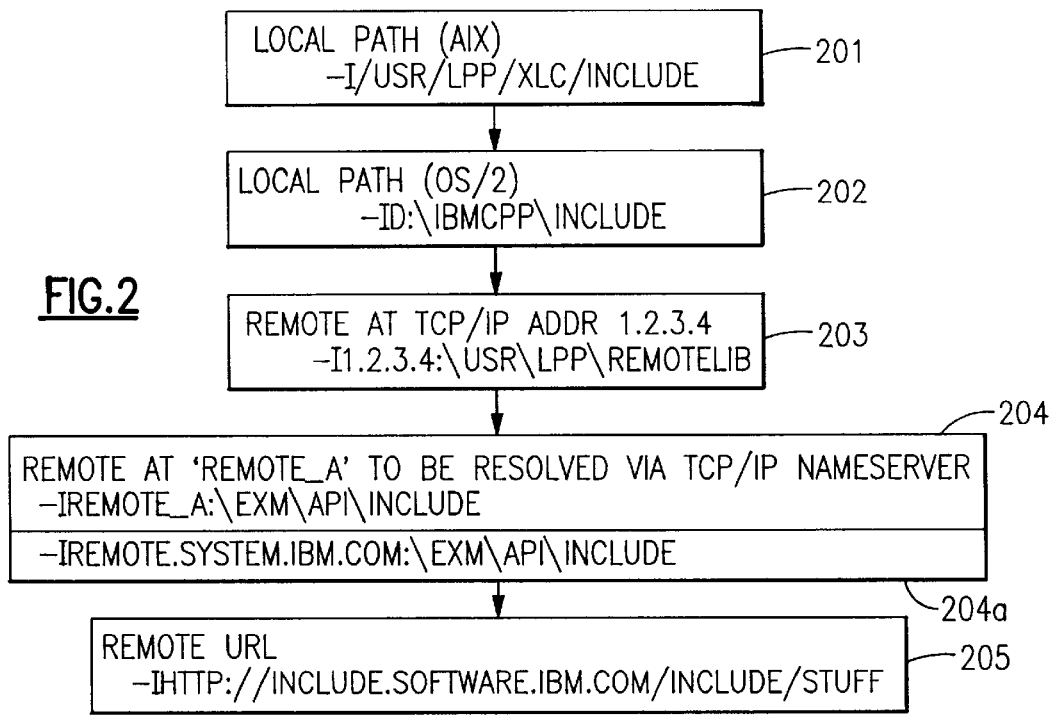
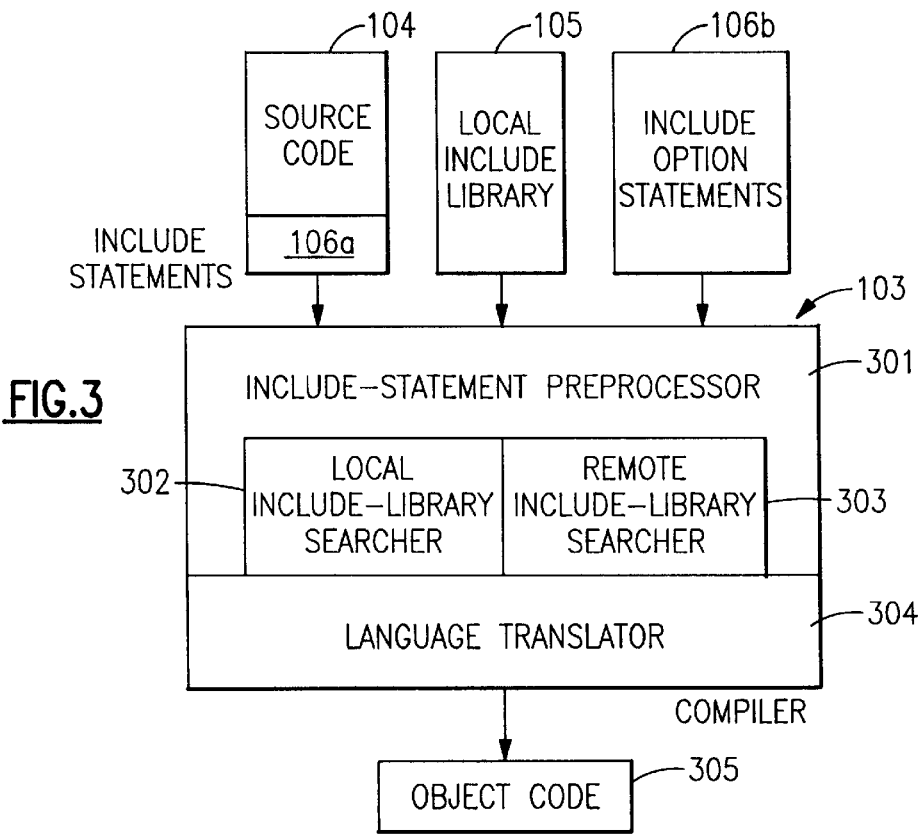

| (NAME) | (ADDRESS) | (ACCESS PARAMETERS) | (METERING PARAMETERS) | (LIB_CONTENTS FILE_ID) |
|---|---|---|---|---|
| 501 | 502 | 503 | 504 | 505 |
| ... | ... | ... | ... | ... |

| (FILE_ID_1) | (FILE_ID_2) | (FILE_ID_3) | ... | (FILE_ID_N) |
|---|---|---|---|---|
| 601 | 602 | 603 | 604 | 605 |

METHOD AND APPARATUS FOR REMOTE SOURCE CODE INCLUSION

CROSS-REFERENCE TO RELATED APPLICATION

This application is related to the commonly owned, concurrently filed application of the same inventors, Ser. No. 09/009,444, entitled "METHOD AND APPARATUS FOR REMOTE OBJECT CODE INCLUSION", incorporated herein by reference.

BACKGROUND OF THE INVENTION

1. Field of the Invention

This invention is related to computer language compilers and particularly to program include statement processing.

2. Description of the Related Art

Computer language compilers are well known in the art. Basically, a compiler is a computer program that translates a computer source program into an executable program, or object program. The input to the compiler is source code, which is written in a source language such as C++. The output from the compiler is object code, which is itself executable machine code or is suitable for processing to produce executable machine code. Note that in general, the term "compiler" applies to programs written in high-level languages, and the terms "translator" and "assembler" apply to low-level computer languages or assembly languages. In this document, the term "compiler" is used to mean any and all of these things.

A source program may contain one or more preprocessor directives known as include directives or include statements. Each include statement directs the compiler preprocessor to replace the statement with the contents of a specified file, known as an include file. An include file is a source file that is used by including it (i.e., inserting it inline) in a program being compiled during the compiler preprocessing phase. Normally, include files contain common data format definitions, common constant definitions, common executable macros, or common subroutines.

Include files normally reside in libraries contained in specified subdirectories. An include statement may explicitly specify the library containing an include file by specifying a drive and path location. Otherwise, include file libraries are specified by compiler options that are known as include options. An include option is a compiler option (i.e., an optional compiler meta-statement) for specifying which program library or libraries to search for files specified in include statements. Include options function in a manner similar to PATH statements in DOS and its derivatives to specify a search path for locating files (in this case, include files).

Conventionally, when writing source code with include statements, the library containing the include files must reside on either a local drive or a connected network drive; "connected network" here means either a local area network (LAN) or other network in which LAN server disk drives or other disk drives can be accessed as if they were locally connected to each client system on the LAN. In an OS/2®, Window®, or DOS environment, the LAN server disk drives are referred to by a drive letter such as W: or Z:. In a UNIX®-based system, access to remote files is accomplished via a network file system (NFS) and is limited to disk drives attached to systems comprising the LAN. In both the above cases, a language compiler accesses the accessible disks as if they were locally attached.

As a result of this local access requirement for the include file libraries, two sets of expenses are incurred. First, software producers pay media and distribution costs for the (sometimes rather substantial) amounts of data written on disks or CD-ROMs that are used for product distribution. Second, users have to allocate substantial amounts of space on their personal computers to store the source libraries distributed with compilers and product application program interfaces (APIs). With the introduction of thin clients (cost-reduced computers having small amounts of memory and disk space that rely on a network to store most of their data), the situation becomes even more problematic.

Other reasons for dissatisfaction with the existing art relate to the practice of team software development. During development of software, programmers within a development team are conventionally given access to the same local area network (LAN) so that they can easily share their data. This practice is based on the paradigm ascribing most or all of the programmers in a team to a single company developing code.

With the widespread acceptance of the Internet and the emergence of virtual enterprises, this static team paradigm is being replaced with that of a dynamic, widely dispersed team of programmers, cooperating on a development project across vast distances, time zones, continents, etc., making it impossible to place all of the software developers on a single LAN. It is often necessary for a team of programmers to be able to access a common set of source libraries that, because of the distances involved, cannot be made available on any single LAN as a single instance.

A number of products (e.g., IBM TeamConnection) exist for software version management and group development, however, they either provide programmers with access to shared data within a LAN or replicate data among LANs or single nodes. Some way to access common source libraries is what is required.

SUMMARY OF THE INVENTION

Existing compilers do not automatically access a non-connected network destination (for example, an arbitrary Internet location outside of a local area network) that contains file libraries or other program elements, so these elements have to be separately transferred to the local system before the code can be compiled.

The present invention relates to a computer language compiler for translating a computer source program into an executable object program and contemplates a method and apparatus for operating the compiler to process include statements contained in the source program. In accordance with the invention, the compiler examines each include statement to determine whether it specifies an include file resident at a non-connected network location. If it does, the compiler establishes a connection with the network location and obtains the include file via the connection. The retrieved include file is then used for compiling the source code to create the object program.

The compiler may also receive as input one or more include options, each of which specifies an include file library containing one or more include files. In such a case, the compiler may initially examine each include option to determine whether it specifies an include file library resident at a non-connected network location. If it does, the compiler may establish a connection with the network location and obtain a list of the contents of the include file library via the connection.

The present invention allows the specification of either a Transmission Control Protocol/Internet Protocol (TCP/IP)

address or name (to be resolved via a name server or local TCP/IP name resolution file) or a World Wide Web (WWW) uniform resource locator (URL) of a non-connected system that contains the libraries, source code, etc. required to properly compile the program under construction.

When the computer language compiler preprocessor encounters such a remote address specification, it calls a program which attempts to make the remote connection. If the remote connection is made, the source code/library specified is accessed via an appropriate protocol. These remote addresses are specified to the compiler via a compiler include option, just as it is done for local include paths currently.

A library definition file may be provided that contains a user ID/password, along with any other required parameters that may need to be specified, so that in the case of a protocol that has more complex access requirements, for example, the File Transfer Protocol (FTP), the compiler will know how to login and get the data it needs to include. Such a library definition file may also contain any information that may be necessary in case the remote library charges a fee for supplying remote include files, such as an account number to be charged.

BRIEF DESCRIPTION OF THE DRAWINGS

FIG. 2 shows representative compiler include statements of the present invention.

FIG. 3 shows the compiler of the local system shown in FIG. 1.

FIG. 5 shows a library definition file.

FIG. 6 shows a library contents file.

DESCRIPTION OF THE PREFERRED EMBODIMENT

Figure 1:
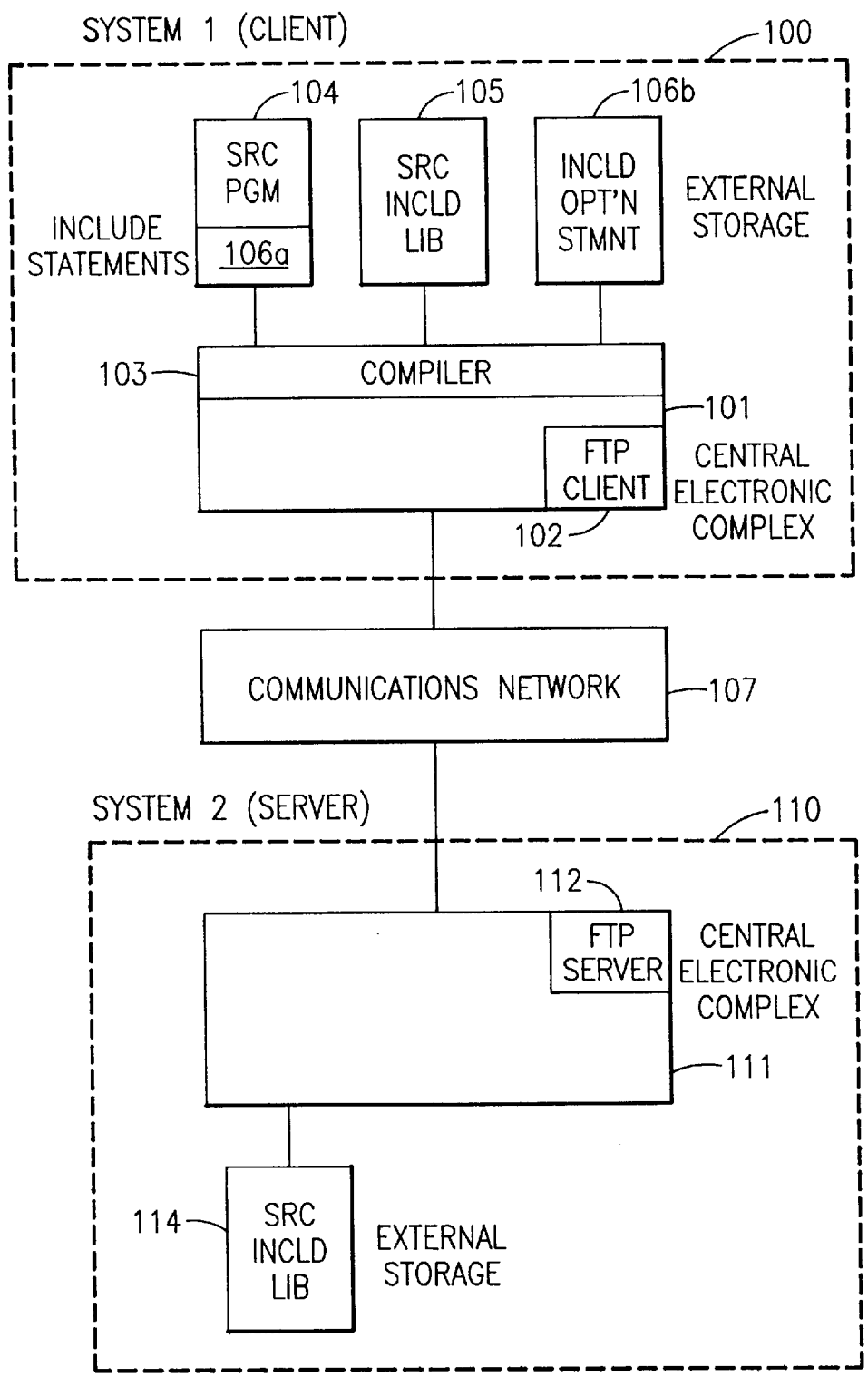
FIG. 1 shows a preferred embodiment of the present invention in a client/server configuration.

FIG. 1 shows a preferred embodiment of the present invention in a client/server configuration. The configuration comprises two computer systems, a client system 100 (SYSTEM 1) and a server system 110 (SYSTEM 2), connected by means of a communications network 107. Client system 100 includes a central electronics complex (CEC) 101, while server system 110 includes a similar central electronics complex 111. Communications network 107 may be implemented using any suitable configuration or protocols, it may be a LAN or a wide-area network (WAN), or the Internet at large. In a preferred embodiment, communications network 107 is the Internet, supporting TCP/IP communications.

Figure 13:
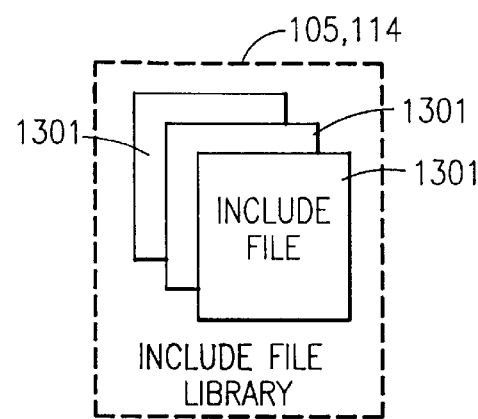
FIG. 13 shows an include file library.

Compilation takes place on client system 100. A compiler 103 is started by a programmer on system 100. A compilation preprocessing phase brings in a source program file 104 (SRC PGM), which contains include statements 106a for inclusion and concurrent compilation of one or more source code segments or include files 1301 (FIG. 13). As shown in FIGS. 1 and 13, include files 1301 may be found either in local source include libraries 105 (SRC INCLD LIB) resident on client system 100 or in remote source include libraries 114 resident on server system 110. The remote source include libraries 114 are retrieved by the compiler 103 by means of an FTP client 102, which transfers the designated remote source include files 1301 from the remote source include libraries 114 on system 110 to system 100 by communication with an FTP server 112 on system 110.

Although an FTP client 102 and server 112 are shown, this is only by way of example; in general, the file transfer is not limited any particular protocol. Protocols other than FTP, such as hypertext transfer protocol (HTTP) or trivial file transfer protocol (TFTP), may be used instead.

Include file names can be specified to compiler 103 either explicitly, by use of an explicit include statement 106a, or implicitly, for example, by specifying a macro by name.

FIG. 2 shows representative optional compiler include options 106b incorporating both local and remote library specifications. For one preferred embodiment, the include options for an IBM VisualAge(TM) C++ compiler are used. It will be understood by persons skilled in the art that the techniques of this invention apply to other compilers, other compiled programming languages, and other types of systems besides the ones that have been enumerated in FIG. 2. FIG. 2 shows a number of syntactic variations of an include option which permit the compiler 103 to determine the location of the include source libraries the compiler needs to process.

A local include option 201 for the IBM AIX® operating system consists of a general parameter identifier "-" (i.e., a hyphen) followed immediately by the parameter name I and the parameter value/usr/lpp/xlc/include. The parameter value represents a local AIX directory, thus implying that the library/usr/lpp/xlc/include can be accessed using file system access methods on the local AIX system.

Similar include options may be specified in other OS environments. Thus, an include option 202 for the OS/2® operating system imbeds the value of D:\ibmcpp\include, designating a local OS/2 operating system path of drive D and directory \ibmcpp\include.

In accordance with the present invention, a remote include library specification may be made in a manner similar to the local include library specifications described above, except that the specified library is on a (disconnected) remote system rather than a local one. Thus, a remote include library specification may be made using an explicit TCP/IP address 203. When the include library value of 1.2.3.4:\usr\lpp\remotelib is detected by the compiler, it will be understood that this string, including a colon in the middle, is not a valid AIX path designation. The colon delimiter separates the IP address 1.2.3.4 from the rest of the library name. Once the compiler 103 detects that an IP address has been specified for this library, it will treat this as a remote library specification, which should be accessed via FTP by connecting to the IP address indicated by the part of the parameter value that precedes the colon.

Figure 9:
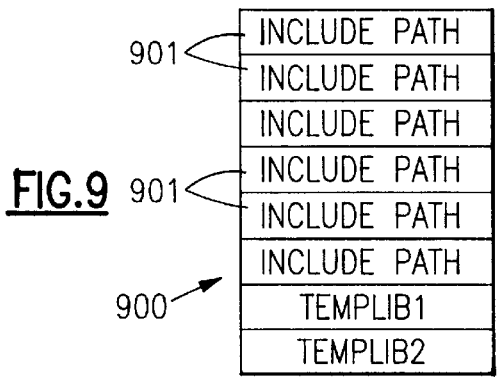
FIG. 9 shows the include list with the paths of the temporary libraries.

Subsequently, an FTP transfer from system 1.2.3.4 (in this case, system 110) is initiated. When the system 1.2.3.4 is reached by the FTP client 102, the FTP client obtains a list of files in the directory \usr\lpp\remotelib from the FTP server 112 on the target remote system 110. The list of files is called a library contents file (FIG. 6) and is stored by the compiler 103 in a temporary library TEMPLIB1 (FIG. 10), as described below. The TEMPLIB1 path is added as an entry to an include list (FIG. 9) for subsequent location of specific include files 1301 when include statements 106a are encountered within the compiled source program 104.

Figure 10:
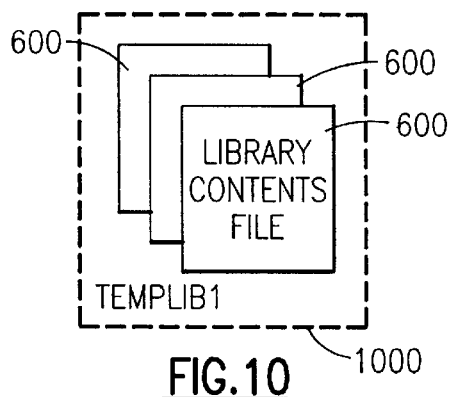
FIG. 10 shows the temporary library (TEMPLIB1) for the library contents files accessed via FTP.
Figure 11:
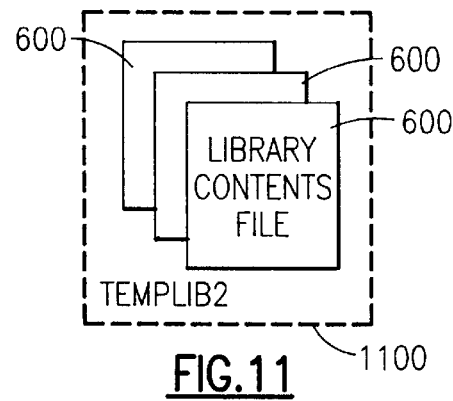
FIG. 11 shows the temporary library (TEMPLIB2) for the library contents files accessed via HTTP.

FIG. 6 shows a library contents file 600. Each library contents file 600 contains a list of file names 601–605, recorded as character strings, in a designated include directory, either remote or local, that was specified by the -I parameter on the compiler invocation. Referring to FIGS. 10–11, library contents files 600 are stored in either a first temporary library (TEMPLIB1) 1000 for files 1301 accessed via FTP or a second temporary library (TEMPLIB2) 1100 for files accessed via HTTP. Each temporary library 1000 or 1100 corresponds to a path on the local system 100.

Referring to FIG. 5, local system 100 has a library definition file 500 which it uses for retrieving remote include files 1301 using a defined protocol (e.g., FTP or HTTP). Library definition file 500 contains one entry for each remote source include library 114 defined. Each entry in turn contains five items of data: the library name 501, the library address (remote location) 502, library access parameters (pertinent to the specified library access method) 503, library metering parameters 504, and library contents file identifier 505.

Similarly to the previous example, instead of an explicit IP address, a TCP/IP name resolvable by a TCP/IP name server may be used, as shown in an example of an OS/2 remote include path specification 204. In this case, even though the colon is valid within an OS/2 path string, the compiler 103 will observe that REMOTE_A is not a valid drive designator, and therefore must be interpreted to be a network destination for the location of the include path \exm\api\include. Consequently, a contents file for that path on system REMOTE_A will be retrieved via FTP for subsequent use.

In a similar fashion, a more complex system name (REMOTE.SYSTEM.IBM.COM) may be used as shown at 204a.

Another way to indicate a remote path is by means of a uniform resource locator (URL), as shown in the next example 205. In this case, the compiler 103 will determine the remote location designation as: http://INCLUDE.SOFTWARE.IBM.COM. Because the remote location name is prefixed with http://, the compiler 103 will use the HTTP protocol to retrieve a contents file (FIG. 6) for the designated path/include/stuff and store the contents file in a temporary library TEMPLIB2. The TEMPLIB2 path is then added to the include list (FIG. 9) for later searching.

Note that the include path specifications are not limited to compiler invocation performed via line commands and associated parameters. The same method would apply to graphical tools where the include libraries are enumerated in appropriate compiler settings windows or profiles.

Also note that the program include statement syntax allows implicit path specification for include files 1301 (in which case the whole of an include path is searched for a specific file name to be included) or explicit file specification which overrides the default include path and indicates the exact location of a file to be included, for example, #include "D:\a\b\c\xxx.h". The double quotes denote explicit file designation. The same syntax rules that were described above would apply for explicit file designation, so the following include statements are possible within a program:

include 1.2.3.4:\usr\lpp\remotelib\file.hh include REMOTE_SOURCE.SERVER.IBM.COM:D:\exm\api\remotelib\exmpjapc.h (note that the second colon is the drive designation)

include http://INCLUDE.SOFTWARE.IBM.COM:/include/stuff/somefile.h

FIG. 3 shows the components of compiler 103 and the inputs and outputs that relate to include file processing. The compiler 103 comprises (either integrally or as separate components) an include statement preprocessor 301, local and remote include library searchers 302 and 303, and a language translator 304. The resulting output of the compilation process is an object code file 305. As input, the compiler 103 reads in the source code of the program 104, which includes a list of include statements 106a, as well as the list of include option statements 106b containing the search paths that were specified on the compiler invocation. Include statement preprocessor 301 searches local and remote include libraries 105 and 114 for specified include files 1301, using library searchers 302 and 303, in the manner described below.

Figure 12:
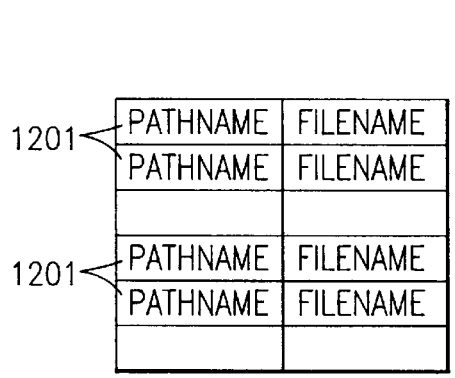
FIG. 12 shows the include file list.

FIGS. 4A–4D show the procedure of the include statement preprocessor 301 as it relates to the present invention. The procedure comprises a compiler options processing stage (FIGS. 4A–4B) in which the include options 106b are processed, followed by an include statement processing stage (FIG. 4C) in which the include statements 106a in source program 104 are processed to generate an include file list (FIG. 12) and then an include file list processing stage (FIG. 4D) in which the include file list generated in the include statement processing stage is processed.

Figure 4A:
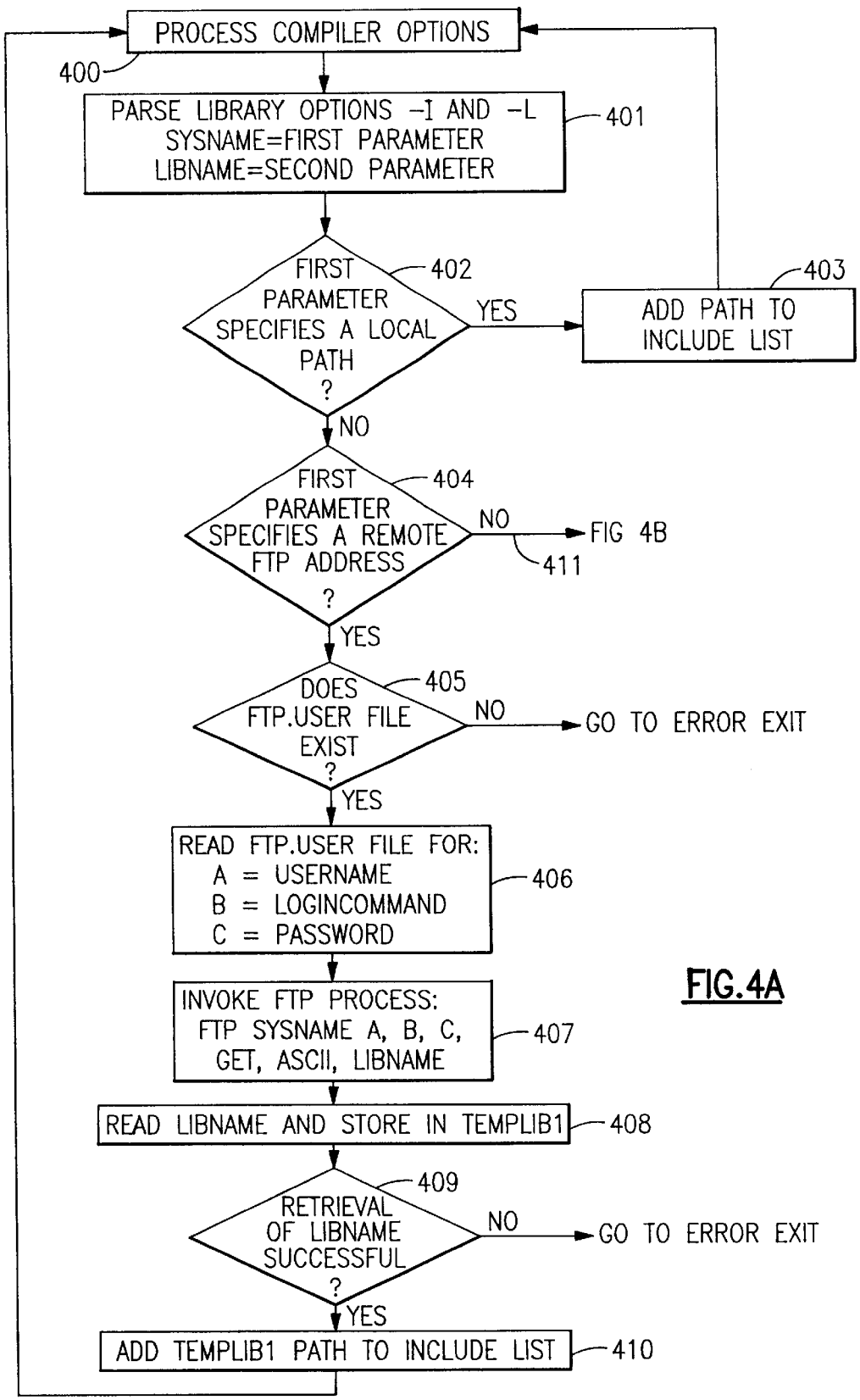
FIGS. 4A–4D show the compiler preprocessing procedure of the present invention.
Figure 4B:
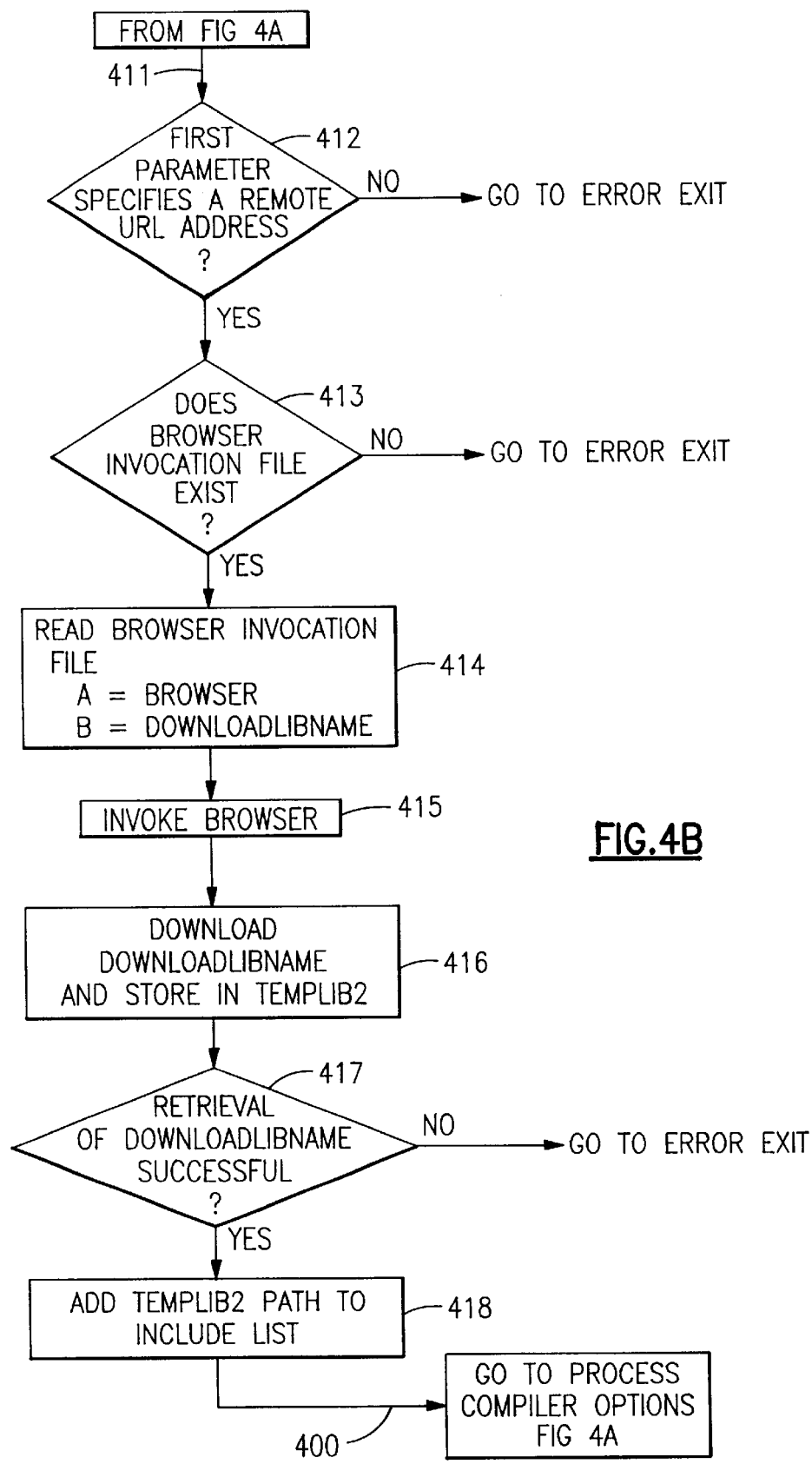

FIGS. 4A–4B show the routine 400 that is invoked during the compiler options processing phase to process compiler options such as include options 106b. Upon being invoked, routine 400 parses compiler library options (e.g., -I and -L keyword parameters of the compiler invocation command in an AIX environment) and extracts appropriate system names (SYSNAME) and library names (LIBNAME) (step 401). If the first parameter (SYSNAME) specifies a local path (step 402), the path is added as an entry 901 to the include list 900 for this compilation (FIG. 9) (step 403). Otherwise, the first parameter (SYSNAME) indicates a remote path, and its value is evaluated with respect to the type of access, this is done by checking the access parameters field 503 of the entry in the library definition file 500 corresponding to the specified remote library 114.

If the first parameter specifies a remote FTP address (step 404), a check is made for the presence of an FTP.USER file, located using the access parameters field 503 in the library definition file 500 (step 405); if the file does not exist, processing is terminated. Otherwise, the FTP.USER file is read and the following information is extracted from it: username (A), login command (B), and user password (C) for FTP access (step 406). Then, using the extracted information, FTP is initiated to the specified remote system 110 (as indicated by SYSNAME), and the presence of the specified remote source include library 114 (as indicated by LIBNAME) on the remote system is verified (step 407). If the specified library 114 is present on the remote system 110, its library contents file 600 (as indicated by the corresponding library contents file identifier 505 in the library definition file 500) is downloaded and stored in the local TEMPLIB1 directory 1000 (step 408). If the retrieval of the specified library contents file 600 is not successful (step 409), processing is terminated, otherwise, the TEMPLIB1 path is added as an entry 901 to the include list 900 (step 410). Processing of compiler library options then continues at step 401 until all have been processed, at which point control passes to the include statement processing routine (FIG. 4C).

If at step 404 the first parameter (SYSNAME) does not specify a remote FTP address, control passes to the portion of the routine 400 shown in FIG. 4B (step 411). There the parameter is checked to see if it is a remote URL address and, if it is not, processing is terminated (step 412). (Processing in routine 400 is restricted to FTP and HTTP access for the sake of simplicity, those skilled in the art will appreciate that other types of access may be used.) If the first parameter SYSNAME is ascertained to be a remote URL address, the process checks for the presence of a browser invocation file (step 413) this file is pointed to by the access parameters field 503 for the specified remote library 114. If the file does not exist, processing is terminated. Otherwise, the browser invocation file is read, and two items of data are extracted: (A) the name of the browser program to be used for accessing the remote URL and (B) the name of the library 114 to download (step 414). Then, the specified browser A is invoked (step 415), and the library contents file 600 (FIG. 6) for the specified remote source include library 114 is downloaded and stored in the directory 1100 serving as the temporary library TEMPLIB2 (step 416). If the retrieval of the specified library contents file 600 is not successful, processing is terminated (step 417). Otherwise, the TEMPLIB2 path is added as an entry 901 to the include list 900 (FIG. 9) (step 418) and control returns to step 401.

Figure 4C:
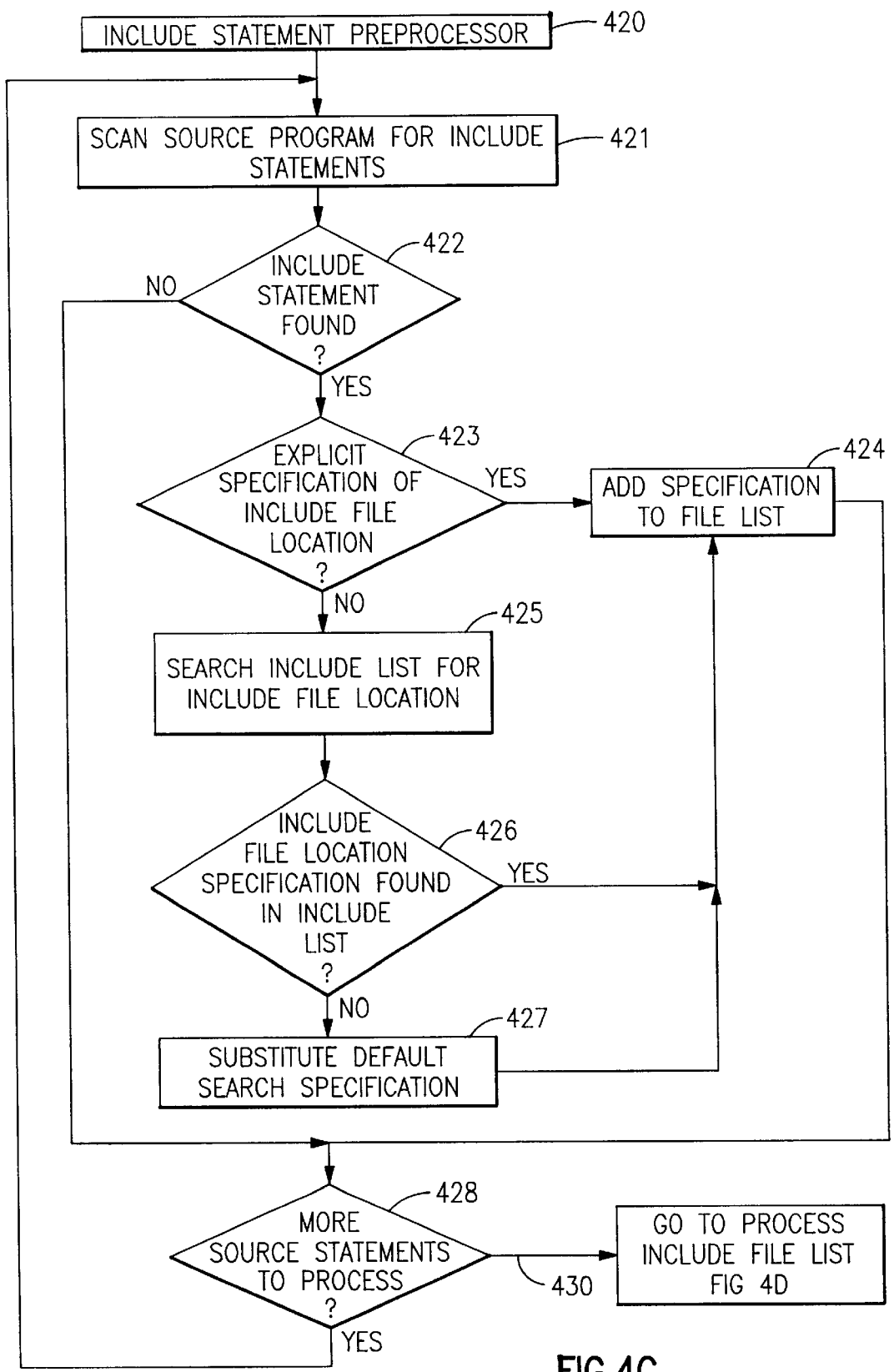

FIG. 4C shows the routine 420 for processing include statements 106a (both explicit and implicit) contained in source program 104. Routine 420 is used to generate an include file list 1200 (FIG. 12), each entry 1201 of which specifies the name (FILENAME) and path location 105 or 114 (PATHNAME) of an include file 1301.

Routine 420 begins by scanning statements in source program 104, examining them one at a time to detect the presence of an include statement 106a (step 421). Upon detecting an include statement 106a (step 422), the routine 420 determines whether the statement includes an explicit path specification of the include file location (step 423). If it does, an entry 1201 comprising the path specification (PATHNAME) and file name (FILENAME) is added to the file list 1200 (step 424), and the routine 420 resumes examining source program statements at step 421.

If at step 423 an include statement 106a is found that does not contain an explicit specification of the include file location, the include paths 901 specified in the include list 900 (corresponding to local directories) are sequentially searched to determine the include file location (step 425). For an entry 901 specifying a local source include library 105 (corresponding to a local directory), this is done by searching the corresponding local directory. For an entry 901 specifying a temporary library 1000 (TEMPLIB1) or 1100 (TEMPLIB2), this is done by searching each library contents file 600 contained in the corresponding local TEMPLIB directory, without accessing the remote libraries 114 themselves at this point of the procedure.

If the include file location is found in the include list 900 (step 426), the location is added to the file list 1200 (step 424). If the include file location does not appear in the include. list 900, a default search specification is substituted (step 427) and added to the include file list 1200 at step 424. If there are remaining source code statements to process (step 428), examination of source code statements resumes at step 421, otherwise, control passes to the routine (FIG. 4D) for processing the include file list 1200.

Figure 4D:
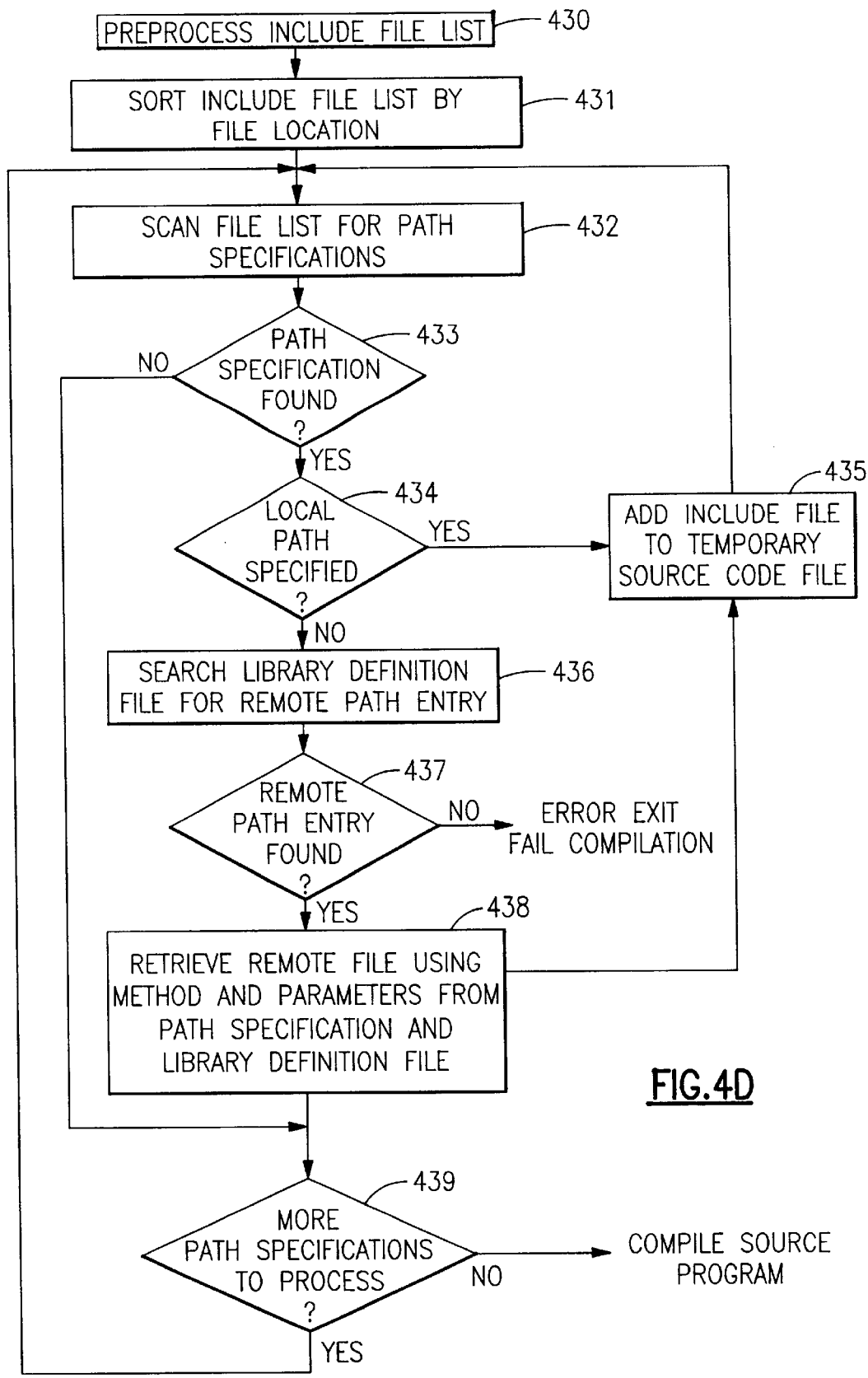

FIG. 4D shows the routine 430 for processing the include file list 1200. The include file list 1200 is first sorted by path name (PATHNAME) so that all the entries 1201 for include files 1301 residing in the same location are together (step 431). The include file list 1200 is then scanned for path specifications (step 432). When a path specification is found (step 433), the routine 430 determines from the path name whether a local path is specified (step 434). If a local path is specified, the routine 430 copies each include file 1301 (if it exists) in the list 1200 having that path name from the corresponding local source include library 105 to an include file temporary source code file for the compilation (not shown) (step 435) and loops back to step 432 to scan for more path specifications.

If it is determined at step 434 that the path specification (PATHNAME) is not a local path, then the path is a remote path and the library definition file 500 is searched for an entry corresponding to the path specification (step 436). If the corresponding entry is not found in the library definition file 500, then the compilation fails and an error exit is taken (step 437). Otherwise, each remote include file 1301 in the list 1200 having that path name is retrieved from the corresponding remote source include library 105 using the retrieval method and parameters specified by the path specification and the corresponding library definition file entry (step 438). When a remote include file 1301 has been retrieved, it is added to the include file temporary source code file (step 435).

The include file list 1200 of path specifications is processed until all entries 1201 have been processed (step 439), at which point the compilation of the source code 104 together with the include file temporary source code file just assembled is initiated using well known source code compilation techniques. After the compilation has been completed, all temporary local files are deleted, including the temporary source code file.

Most compilers permit their users to generate compilation listings (hard or softcopy). These listings usually indicate from where (which library) a particular include file was taken. With the present invention, the compilation listing will also indicate which system an include file came from and which method was used for retrieval.

Source code browsers and source-level debuggers permit access to include files as a part of their browsing process. The retrieval mechanism disclosed here that is used for compiler is also applicable to source code browsers. The retrieval mechanism disclosed here also applies to other source-related tools, such as program metrics tools (for example, complexity measurements, performance estimators) and cross-compilers.

Figures 7, 8:
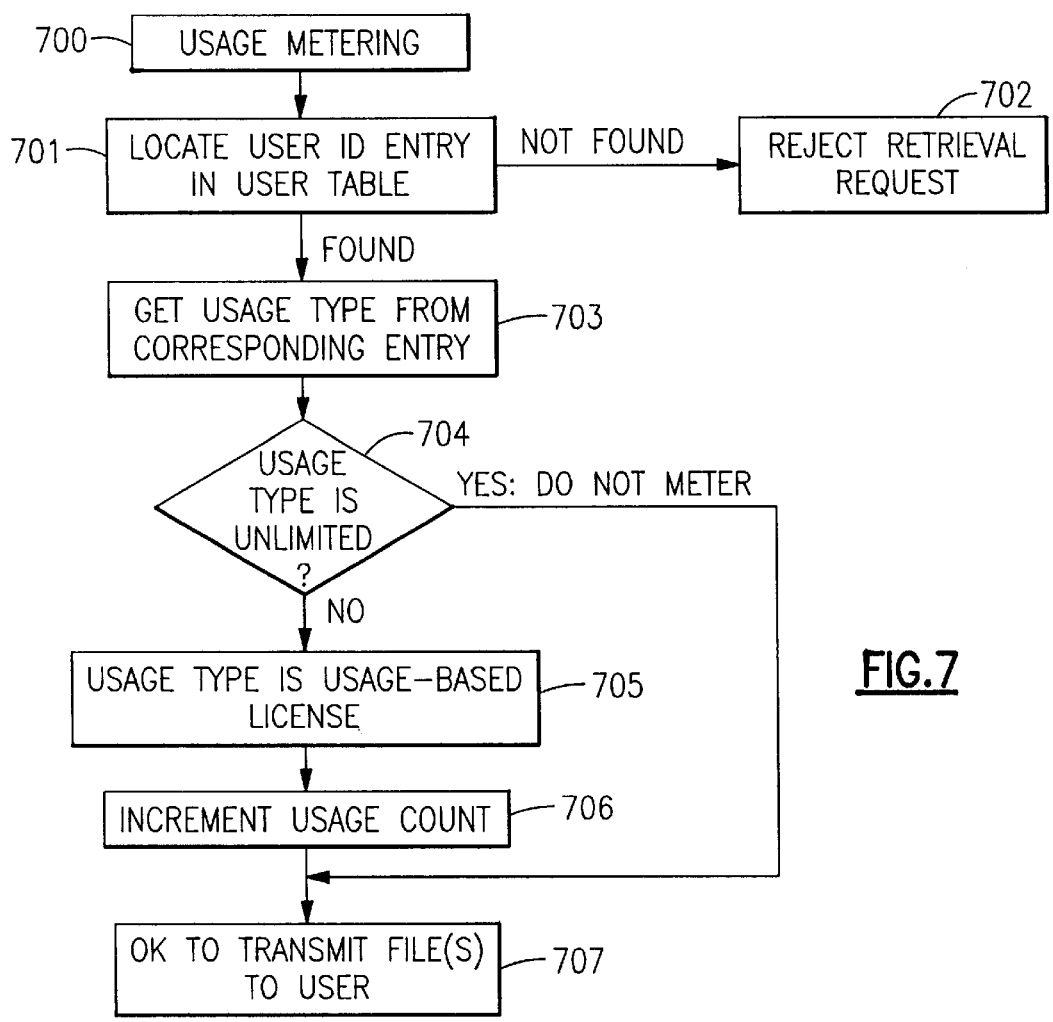
FIG. 7 shows the usage metering procedure of the present invention.
FIG. 8 shows a user information table.

FIG. 8 shows a user table 801 containing user information associated with user access to the include files 1301 on a remote network server (such as system 110). The user table 801 contains identifiers of valid users 802 having the right to access the include files 1301 on a network server. Note that in practice, the user IDs will most likely be randomly or sequentially generated alphanumeric strings without any particular meaning attached; in fact, the most likely user ID is the customer license number. Along with each user ID, an access-type field 803 is included, indicating whether the access is unlimited (as at 806) or usage based (as at 808). A usage count field 804 is initially set to 0 (as at 807) for all new users and is incremented to indicate the usage count (as at 809) with every use. Every time a user is billed for a particular number of uses, the usage count is transferred to the billing system (not shown) and the usage field 804 is reset to 0. For usage-based users, a charge information field 805 is included, indicating a user account number (as at 810) for billing purposes.

FIG. 7 shows the usage metering routine 700 performed by the remote include file server 110. If the usage metering routine 700 is required, the user identifier entry 802 of the user accessing a library is located in the user table 801 (step 701). (The server 110 gets the userid in the request from the client 100, for HTTP as well as FTP accesses.) If at step 701 the user identifier is not found among the entries 802 in the user table 801, the user is not recognized as a valid user who is entitled to access that library and the retrieval request is rejected (step 702). Otherwise, the usage type is retrieved from the user table entry 803 associated with the present user (step 703). If the present user access type 803 is entitled to unlimited usage as at 806 (step 704), metering is suspended, otherwise, if the access type is a usage-based license as at 808 (step 705), the usage count field 804 associated with the present user (initialized to zero prior to the first use) is incremented (step 706). Then the retrieval of the requested include file(s) 1301 is permitted (step 707).

While we have described our preferred embodiments of our invention, it will be understood that those skilled in the art, both now and in the future, may make various improvements and enhancements which fall within the scope of the claims which follow.

What is claimed is:

1. In a computer language compiler for translating a computer source program into an executable object program, said source program containing one or more include statements, each of said include statements directing the replacement of the statement with the contents of an include file specified by the statement, a computer-implemented method of operating said compiler on a local system to process said include statements, comprising the steps of:

scanning said source program for include statements specifying include files resident at non-connected remote network locations;

in response to detecting an include statement in said source program specifying an include file, adding an entry for said include file to an include file list;

scanning said include file list for entries for include files resident at non-connected network locations; and in response to detecting an entry for an include file resident at a non-connected network location, automatically establishing a connection with said remote network location and obtaining said include file via said connection.

2. The method of claim 1 in which the detected include statement specifies a network address of said non-connected remote network location.

3. The method of claim 1 in which the detected include statement specifies a name of said non-connected remote network location that is resolvable by a name server.

4. The method of claim 1 in which the detected include statement specifies a uniform resource locator for said include file.

5. The method of claim 1 in which the entries in said include file list are sorted by location before being scanned.

6. In a computer language compiler for translating a computer source program into an executable object program, said source program containing one or more include statements, each of said include statements directing the replacement of the statement with the contents of an include file specified by the statement, said compiler also receiving as input one or more include options, each of which specifies an include file library containing one or more include files, a computer-implemented method of operating said compiler on a local system to process said include statements, comprising the steps of:

examining each of said include options to determine whether the option specifies an include file library resident at a non-connected remote network location;

in response to detecting an include option specifying a include file library resident at a non-connected remote network location, establishing a connection with said remote network location and obtaining a list of the contents of said include file library via said connection;

scanning said source program for include statements specifying include files resident at non-connected remote network locations; and in response to detecting an include statement in said source program specifying an include file resident at a non-connected remote network location, automatically establishing a connection with said remote network location and obtaining said include file via said connection.

7. The method of claim 6 comprising the further step of storing said list in a temporary library accessible to said compiler.

8. The method of claim 7 in which lists of the contents of a plurality of remotely resident include file libraries are stored in said temporary library.

9. The method of claim 7 in which said temporary library has a path specification, said method comprising the further step of adding said path specification to a list of path specifications for include file libraries.

10. The method of claim 6, comprising the further step of:

storing library definition data on said local system for include file libraries resident at non-connected remote network locations.

11. The method of claim 10 in which said data specifies the network locations of said libraries.

12. The method of claim 10 in which said data specifies access parameters for said libraries.

13. The method of claim 10 in which said data specifies metering parameters for said libraries.

14. The method of claim 10 in which said data specifies the include files contained in said libraries.

15. The method of claim 14 in which said scanning step comprises the steps of:

scanning said source program for include statements; and in response to detecting an include statement, determining whether said include statement specifies an include file resident at non-connected remote network locations.

16. The method of claim 15 in which said determining step comprises the step of:

examining the include files specified for each of the libraries in said library definition file to determine the library containing the include file referenced in said statement.

17. In a computer language compiler for translating a computer source program into an executable object program, said source program containing one or more include statements, each of said include statements directing the replacement of the statement with the contents of an include file specified by the statement, apparatus for processing said include statements on a local system, comprising:

means for scanning said source program for include statements specifying include files resident at non-connected remote network locations;

means responsive to the detection of an include statement in said source program specifying an include file for adding an entry for said include file to an include file list;

means for scanning said include file list for entries for include files resident at non-connected network locations; and means responsive to detecting an entry for an include file resident at a non-connected network location for automatically establishing a connection with said remote network location and obtaining said include file via said connection.

18. The apparatus of claim 17 in which the entries in said include file list are sorted by location before being scanned.

19. A program storage device readable by a machine, tangibly embodying a program of instructions executable by the machine to perform method steps for operating a computer language compiler to process one or more include statements in a computer source program on a local system, said compiler translating said source program into an executable object program, each of said include statements directing the replacement of the statement with the contents of an include file specified by the statement, said method steps comprising:

scanning said source program for include statements specifying include files resident at non-connected remote network locations;

in response to detecting an include statement in said source program specifying an include file resident at a non-connected remote network location, adding an entry for said include file to an include file list;

scanning said include file list for entries for include files resident at non-connected network locations; and in response to detecting an entry for an include file resident at a non-connected network location, automatically establishing a connection with said remote network location and obtaining said include file via said connection.

20. The program storage device of claim 19 in which the entries in said include file list are sorted by location before being scanned.

21. In a computer language compiler for translating a computer source program into an executable object program, said source program containing one or more include statements, each of said include statements directing the replacement of the statement with the contents of an include file specified by the statement, said compiler also receiving as input one or more include options, each of which specifies an include file library containing one or more include files, apparatus for processing said include statements on a local system, comprising:

means for examining each of said include options to determine whether the option specifies an include file library resident at a non-connected remote network location;

means responsive to detecting an include option specifying an include file library resident at a non-connected remote network location for establishing a connection with said remote network location and obtaining a list of the contents of said include file library via said connection;

means for scanning said source program for include statements specifying include files resident at non-connected remote network locations; and means responsive to the detection of an include statement in said source program specifying an include file resident at a non-connected remote network location for automatically establishing a connection with said remote network location and obtaining said include file via said connection.

22. A program storage device readable by a machine, tangibly embodying a program of instructions executable by the machine to perform method steps for operating a computer language compiler to process one or more include statements in a computer source program on a local system, said compiler translating said source program into an executable object program, each of said include statements directing the replacement of the statement with the contents of an include file specified by the statement, said compiler also receiving as input one or more include options, each of which specifies a library containing one or more include files, said method steps comprising:

examining each of said include options to determine whether the statement specifies an include file library resident at a non-connected remote network location;

in response to detecting an include option specifying an include file library resident at a non-connected remote network location, establishing a connection with said remote network location and obtaining a list of the contents of said include file library via said connection;

scanning said source program for include statements specifying include files resident at non-connected remote network locations; and in response to detecting an include statement in said source program specifying an include file resident at a non-connected remote network location, automatically establishing a connection with said remote network location and obtaining said include file via said connection.

* * * * *